United States Patent Office 2,870,162
Patented Jan. 20, 1959

2,870,162

PRODUCTION OF CERTAIN TRYPTAMINES AND COMPOUNDS PRODUCED IN THE PROCESS

Merrill E. Speeter and William C. Anthony, Kalamazoo Township, Kalamazoo County, Mich., assignors to The Upjohn Company, Kalamazoo, Mich., a corporation of Michigan No Drawing. Application April 28, 1954
Serial No. 426,301

26 Claims. (Cl. 260—319)

The present invention relates to a novel process for the preparation of 3-(2-aminoethyl)-indoles (tryptamines) and to novel compounds produced therein. More particularly, the invention is concerned with the reduction of 3-indoleglyoxylamides and 3-indoleglycolamides with lithium aluminum hydride and to novel 3-indoleglyoxyl-amides and to novel 3-indoleglycolamides useful therein.

It is known that 3-indoleglyoxylic acid esters can be reduced with aluminum amalgam (Baker, J. Chem. Soc. 1940, 458–60), but in the disclosed Baker process, the ring-attached carbonyl group is reduced only to a carbinol group and the carboxylic carbonyl is not reduced at all. Thus when Baker reduced 3-idoleglyoxylic acid esters (the methyl or ethyl ester) with aluminum amalgam, he obtained the corresponding 3-indoleglycolate. It is known also that certain glyoxylic acids can be reduced with lithium aluminum hydride. By this process, however, the corresponding ethylene glycol is obtained. Thus phenylglyoxylic acid was reduced by Nystrom et al., J. Am. Chem. Soc. 69, 2548–9 (1947) to phenylethylene glycol.

It has now been found, contrary to the teachings of the prior art, that when lithium aluminum hydride is used to reduce a 3-indoleglyoxylamide, both the carboxylic carbonyl group and the ring-attached carbonyl group are completely reduced to methylene groups.

The process of the present invention is applicable to any 1-hydro-3-indoleglyoxylamide. The term "1-hydro" is used to denote the presence of hydrogen in the 1-position. The indole nucleus, otherwise, can be substituted or unsubstituted. Substituents reducible with lithium aluminum hydride under the conditions of the present process are usually undesirable unless however the reduced form of the substituent is desired in the final compound.

It has been further found, in accordance with the present invention, that the desired tryptamines can be obtained in high yield by subjecting the starting indole to glyoxylation with an oxalyl halide, converting the 3-indoleglyoxylyl halide thus formed to an amide by reaction with ammonia or a primary or secondary amine, and reducing the resulting 3-indoleglyoxylamide with lithium aluminum hydride. By this process an indole can be converted to the desired tryptamine in three simple steps, each of which gives a high yield. The desired tryptamines of the invention are thus effectively obtained in high overall yield by subjecting the starting indole successively to glyoxylation with an oxalyl halide, aminolysis with ammonia or an amine, and reduction with lithium aluminum hydride.

Indoleglyoxylic acids or derivatives thereof can be prepared by procedures known in the art. Baker supra, for example, describes the preparation of methyl 3-indoleglyoxylate through the interaction of 3-indolyl magnesium iodide and methyl oxalyl chloride. A like process is shown by Majima et al., Ber. 57, 1449–53 (1924); Oddo et al., Gazz. chim. ital. 57, 827–35 (1927). Elks et al., J. Chem. Soc. 1944, 630, prepared ethyl 3-indoleglyoxylate by the reaction of ethyl oxalate and indole. Ethyl 2-methyl-3-indoleglyoxylate is prepared by reacting 2-methylindole with ethyl oxalate, according to Angeli et al., Atti, accad. Lincei, 16 [II], 790–5; C. A. 2, 1833 (1908); Chem. Zentr. 1908, I, 739. Giua, Gazz. chim. ital. 54, 593–7 (1924), discloses the preparation of 2-methyl-3-indoleglyoxylyl chloride through the direct action of oxalyl chloride on 2-methylindole. He also mentions the preparation of 2-indoleglyoxylyl chloride, but according to this invention it has been found that the direct interaction of indole and oxalyl chloride gives only 3-indoleglyoxylyl chloride. Amides can be formed by subjecting an ester to aminolysis, i. e., solvolysis with ammonia or an amine (primary or secondary). Baker and Oddo et al. prepared 3-indoleglyoxylamide by reacting an ester with ammonia. It has been found, according to this invention, however, that the amides are most advantageously formed by reacting the indole with oxalyl halide, e. g., oxalyl chloride, and subjecting the formed 3-indoleglyoxylyl halide to aminolysis. By following one or more of the above procedures, and using the appropriate indole, various starting 3-indoleglyoxylamides for use in the process of this invention can easily be prepared.

For the purpose of more fully illustrating the present invention, the starting indoles, for the most part, can be represented by the following formula:

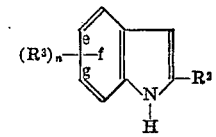

wherein R² represents hydrogen; an aryl radical, e. g., the radicals of the benzene and naphthalene series such as phenyl, naphthyl, lower-alkyl substituted phenyl and naphthyl such as tolyl and 2-methylnaphthyl, lower-alkoxy substituted phenyl and naphthyl such as methoxyphenyl and 2-ethoxynaphthyl, halogen substituted phenyl and naphthyl such as chlorophenyl, 2-chloronaphthyl, biphenylyl, and the like; an aralkyl radical, e. g., benzyl, phenethyl, halobenzyl such as para-chlorobenzyl, alkylbenzyl such as para-ethylbenzyl, alkoxybenzyl such as paramethoxybenzyl, and the like; a lower-alkyl radical containing up to and including eight carbon atoms, e. g., methyl, propyl, octyl, and the like, and R² advantageously contains not more than fifteen carbon atoms. R³ is selected from the group consisting of halogen, e. g., chlorine, bromine, and iodine; a cyano radical; a carboxy radical; a lower-carbalkoxy radical, e. g., carbomethoxy, carbethoxy, carbobutoxy, and the like; a dialkylamino radical, e. g., dimethylamino, diethylamino, methylbutylamino, and the like; a lower-alkyl radical; an aryl radical; an aralkyl radical; an aryloxy radical, e. g., phenoxy, and the like; a lower-alkoxy radical, e. g., methoxy, isopropoxy, butoxy, and the like; a benzyloxy radical, e. g., benzyloxy, benzhydryloxy, alkylbenzyloxy, such as para-methylbenzyloxy and para,para'-dimethylbenzhydryloxy, halobenzyloxy, such as para-chlorobenzyloxy and para, para'-dichlorobenzhydryloxy, alkoxybenzyloxy, such as, para-methoxybenzyloxy and para,para'-dimethoxybenzhydryloxy, and the like; an acyloxy radical wherein the acyl substituent is from an organic carboxylic acid containing from one to eight carbon atoms, e. g., formyloxy, acetoxy, propionoxy, benzoxy, and the like; and a fused arylene radical, e. g., phenylene, naphthylene, and the like, and R³ advantageously contains not more than fifteen carbon atoms. n is an integer from zero to four, and when n is greater than one the R³'s can be alike or different. When n is less than four, of course, it is understood that the remaining positions contain hydrogen. A fused arylene radical, as used herein, encompasses a divalent arylene radical which is fused at positions e, f, or g of the benzene ring of the indole nucleus.

The various substituted indoles employed in the preparation of the essential 3-indoleglyoxylyl halides can be prepared by one of the following procedures:

(1) The 4- and 5-acyloxyindoles are prepared in the manner disclosed by Beer et al. (J. Chem. Soc. 1948, 1605-9) in the preparation of 4- and 5-acetoxyindoles by utilization of the corresponding acylating agent. The 6- and 7-acyloxyindoles are prepared in the same manner utilizing 4-hydroxy-2-nitrobenzaldehyde (Sachs, Ber. 39, 2758), and 3-hydroxy-2-nitrobenzaldehyde (Hodgson et al. J. Chem. Soc. 1925, 877), respectively, as the starting compounds.

(2) The starting 4-, 5-, 6- and 7-benzyloxyindoles can be prepared by the following procedure:

(a) Benzylating 3-hydroxy-2-nitrobenzaldehyde, 4-hydroxy-2-nitrobenzaldehyde, 5-hydroxy-2-nitrobenzaldehyde (Beer et al. supra), 6-hydroxy-2-nitrobenzaldehyde (Beer et al., supra) with a benzyl halide such as benzyl chloride, to produce the corresponding benzyloxy-2-nitrobenzaldehyde; and (b) Reacting the benzyloxy-2-nitrobenzaldehyde with a 1-nitroalkane in the presence of an alkali-metal hydroxide and at a temperature between about zero and about minus forty degrees centigrade to produce a benzyloxy-2-nitro-α-[1-(1-nitroalkyl)]-benzyl alcohol-alkali salt and thereafter acidifying the thus produced salt to yield the benzyloxy-2-nitro-α-[1-(1-nitroalkyl)]-benzyl alcohol, as more fully disclosed in U. S. Patent 2,698,345; and (c) Dehydrating the benzyloxy-2-nitro-α-[1-(1-nitroalkyl)]-benzyl alcohol by reacting the alcohol with an aliphatic acid anhydride at a temperature between about fifty and about 150 degrees centigrade, as more fully disclosed in copending application Serial No. 273,148, filed February 23, 1952, to produce a benzyloxy-β,2-dinitrostyrene; and (d) Subjecting the benzyloxy-β,2-dinitrostyrene to reductive cyclization by reacting the styrene with powdered iron in an organic acid medium, such as acetic, propionic, butyric, or the like, at a temperature between about 50 and about 120 degrees centigrade, as more fully disclosed in copending application Serial No. 273,149, filed February 23, 1952, to produce the 7-benzyloxyindole, 6-benzyloxyindole, 4-benzyloxyindole, and 5-benzyloxyindole, respectively.

The starting halo, cyano, carboxy, carbalkoxy, dialkylamino, aryl, aralkyl, alkyl, and aryloxy substituted indoles can be prepared by reacting the corresponding benzaldehyde with a 1-nitroalkane, to prepare the benzyl alcohol, dehydrating and reductively cyclizing as described above.

(3) The starting alkoxyindoles employed in the process of the present invention are prepared by the procedure outlined by Blaikie et al. (J. Chem. Soc. 1924, 296), in the preparation of 4-, 5-, and 7-methoxyindoles by utilizing the requisite alkoxy-2-nitrotoluene. The 6-alkoxyindoles are prepared by the procedure employed by Kermack et al. (J. Chem. Soc. 1921, 1602).

(4) The preparation of 2-substituted indole is advantageously carried out by various procedures, e. g., the Fisher synthesis, involving phenylhydrazines and the corresponding methyl ketones, is readily applicable to the preparation of 2-substituted indoles. In Elderfield "Heterocyclic Compounds," vol. 3, page 14, 1952, John Wiley and Sons, is shown the reaction of phenylhydrazine and acetophenone to prepare 2-phenylindole. In a similar manner the 2-benzyl- and 2-naphthylindoles are prepared by utilizing the corresponding phenylhydrazine and the corresponding methyl ketone. The Fisher synthesis can also be employed to prepare 2-methylindoles by reacting acetone and the corresponding phenylhydrazine.

The preparation of other 2-lower-alkylindoles is advantageously carried out by the condensation of the corresponding benzaldehyde and 1-nitroalkane as more fully disclosed above and in copending application Serial No. 273,147, filed February 23, 1952.

The starting fused arylene indoles, e. g., benzindoles, are prepared by the process described by Rydon et al., J. Chem. Soc. 1951, 2462.

Representative indoles which can be utilized in the process of the present invention includes the following: indole, 5-methoxyindole, 4-acetoxyindole, 5-benzyloxyindole, 5-(para-methylbenzyloxy)-indole, 5-ethoxyindole, 7-methoxyindole, 5-methoxy-2-phenylindole, 5-ethoxy-2-phenylindole, 6-acetoxy-2-phenethylindole, 5-acetoxy-2-methylindole, 6-(para-chlorobenzyloxy)-indole, 7-benzhydryloxyindole, 4-(para-methoxybenzyloxy)-indole, 6-(para,para'-dimethylbenzhydryloxy)-indole, 5-benzhydryloxyindole, 6-ethoxy-2-(para-ethylbenzyl)-indole, 7-propionyloxy-2-phenethylindole, 5-butyryloxy-2-ethylindole, 6-hexanoyloxyindole, 4-benzyloxyindole, 6-benzhydryloxy-2-naphthylindole, 7-benzyloxy-2-tolylindole, 7-benzhydryloxy-2-(para-methylphenyl)-indole, 4-(para-methylbenzyloxy)-2-methylindole, 6-(para,para'-dichlorobenzhydryloxy)-indole, 5-(para-chlorobenzyloxy)-indole, 4-(para,para' - dimethylbenzhydryloxy) - 2 - (para - ethylbenzyl)-indole, 5-(para,para'-dimethoxybenzhydryloxy)-2-methylindole, 4-benzyloxy-2-ethylindole, 4-benzhydryloxyindole, 4-methoxyindole, 7-ethoxy-2-(para-chlorophenyl)-indole, 4-propoxy-2-(para-ethylbenzyl)-indole, 6-butoxyindole, 5-(para,para'-dichlorobenzhydryloxy)-2-(para-ethoxybenzyl)-indole, 6-hexanoyloxy-2-phenylindole, 7-octanoyloxy-2-naphthylindole, 5-benzyloxy-2-naphthylindole, 4-benzhydryloxy-2-(2-ethoxynaphthyl)-indole, 7-(para,para'-diethoxybenzhydryloxy)-2-(para-chlorobenzyl)-indole, 4-hexoxy-2-(para-ethoxyphenyl)-indole, 6-hexanoyloxy-2-naphthylindole, 4-octanoyloxyindole, 6-(para,para'-dibromobenzhydryloxy)-2-phenylindole, 6-propoxy-2-ethylindole, 4-methoxy-2-propylindole, 5-acetoxy-2-ethylindole, 5-ethoxy-2-(2-chloronaphthyl)-indole, 5-propionyloxy-2-(para-ethylbenzyl)-indole, 4-propionyloxy-2-(para-bromobenzyl)-indole, 4-acetoxy-2-phenethylindole, 4-butyryloxy-2-(para-propylphenyl)-indole, 5-propoxy-2-ethylindole, 6-(para,para'-dichlorobenzhydryloxy)-2-naphthylindole, 7-ethoxy-2-ethylindole, 7-butoxy-2-propylindole, 4-chloroindole, 6-carbethoxyindole, 7-cyanoindole, 5-carboxyindole, 5-cyanoindole, 6-carbomethoxyindole, 5-bromoindole, 7-bromo-2-ethylindole, 4-carbomethoxy-2-benzylindole, 7-cyano-2-tolylindole, 6-carboxy-2-(2-methylnaphthyl)-indole, 4-carbomethoxy-2-phenylindole, 6-carboxy-2-methylindole, 4-cyano-2-phenethylindole, 6-carbopropoxy-2-propylindole, 5-carbobutoxy-2-butylindole, 4-cyano-2-phenethylindole, 4-carboxy-2-phenylindole, 6-carboxyindole, 6-cyano-2-(para-methoxybenzyl)-indole, 4-carbethoxy-2-ethylindole, 4,5-dimethoxy-2-methylindole, 5,7-dichloroindole, 4,7-dicarbethoxy-2-ethylindole, 6,7-dibenzyloxyindole, 5-benzyloxy-6-chloroindole, 6-acetoxy-7-methoxyindole, 5-diethylaminoindole, 6-dimethylamino-2-methylindole, 5,6-dimethoxyindole, 5-bromoindole, 2-hexylindole, 4-methylindole, 5-methylindole, 6-methylindole, 7-methylindole, 2,5-dimethylindole, 5,6-dimethylindole, 2,5-diphenylindole, 2,4-diphenylindole, 5-benzylindole, 4-phenethylindole, 5,7-dichloro-2-biphenylindole, 2-t-butylindole, 2,4,7-trimethylindole, 1-benz-(g)-indole, 1-benz-(f)-indole, 5-phenoxyindole, and the like.

On glyoxylation, the starting indoles are converted to 3-indoleglyoxylyl halides having the formula:

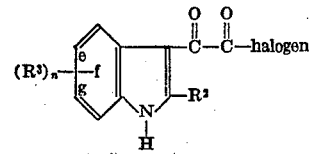

wherein $R^2$, $R^3$, and $n$ are as given above, and on aminolysis with ammonia or a primary or secondary amine, the 3-indoleglyoxylyl halide is converted to a 3-indoleglyoxylamide having the formula:

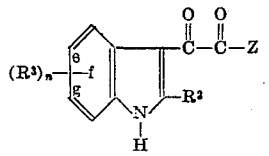

wherein $R^2$, $R^3$, and $n$ have the values given above and Z represents a primary, secondary, or tertiary amido radical. Thus Z can be the amido radical corresponding to ammonia and primary and secondary alkyl, cycloalkyl, aralkyl, and aryl amines, and heterocyclic amines such as piperidine, morpholine, thiamorpholine, pyrrolidine, hexamethyleneimine, tetrahydroisoquinoline, hexahydroisoquinoline (both cis and trans), and the like.

In carrying out the the process of the present invention the 3-indoleglyoxylyl halides are prepared by reacting an indole with an oxalyl halide in the presence of an inert organic solvent, such as ether, petroleum ether, methylcyclohexane, dioxan, and the like. Aromatic hydrocarbons, such as benzene, and the like can also be employed when the acid halide is not to be isolated. Stoichiometric quantities (i. e., equimolar) are advantageously employed. The reaction is advantageously conducted at about 25 degrees centigrade although other temperatures between about ten degrees centigrade and about the boiling point of the solvent employed can also be utilized. The reaction is generally completed between about fifteen minutes and about eight hours, longer periods being required for lower reaction temperatures and/or less reactive indoles. The reaction mixture generally reddens, but soon decolorizes, whereupon a precipitate generally begins to form. After standing between about one and about eight hours, the reaction mixture is cooled to about zero degrees centigrade and the 3-indoleglyoxylyl halide precipitate can be recovered by filtration.

In the preparation of 3-indoleglyoxylamides, the starting indole is first glyoxylated and then subjected to aminolysis advantageously by the process of this invention, wherein the indole is reacted with an oxalyl halide to form a 3-indoleglyoxylyl halide which is reacted with ammonia, or a primary, or secondary amine to form the desired amide. Ammonia is employed to produce a primary amide and primary and secondary amines to produce secondary and tertiary amides, respectively. The aminolysis reaction is advantageously conducted at a temperature between about zero degrees and about 100 degrees centigrade, preferably at about 25 degrees centigrade and is usually completed between about thirty minutes and about five hours, the longer reaction period being required at the lower temperatures. The reaction is advantageously carried out in the presence of inert solvents such as aliphatic hydrocarbons, aromatic hydrocarbons, ketones, and ethers, with benzene being preferred, but the reaction can also be completed without a solvent.

The 3-indoleglyoxylamides thus formed are reduced with lithium aluminum hydride to produce the corresponding tryptamines which for the most part can be represented as having the formula:

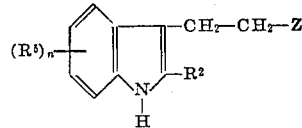

wherein $R^2$, $n$ and Z have the values given above and $R^5$ represents hydroxy, dialkylamino, methylol ($CH_2OH$), aminomethyl ($CH_2NH_2$), halogen, alkyl, aryl, aralkyl, aryloxy, a fused arylene radical, a benzyloxy radical, and a lower-alkoxy radical. Reduction of the 3-indoleglyoxylamides wherein $R^3$, as previously identified, is an acyloxy, cyano, carboxy or a lower-carbalkoxy radical results in the conversion of these substituents to a hydroxy, aminomethyl ($CH_2NH_2$), methylol ($CH_2OH$), and methylol radical, respectively. The reduction of the 3-indoleglyoxylamides is advantageously carried out in the presence of an inert solvent such as ether, tetrahydrofuran, N-ethylmorpholine, and dibutyl ether, and the like, with tetrahydrofuran being preferred. The reduction is advantageously accomplished at the boiling point of the solvent used, although other temperatures between about zero and about 100 degrees centigrade can be employed, and preferably zero to 65 degrees centigrade. After a suitable reaction period, usually from thirty minutes to five hours, the free bases are readily obtained as viscous oils, or in some instances in crystalline conditions, by hydrolyzing the reaction mixture with aqueous ether followed by dilute alkali, decanting the solvent layer, extracting the alkaline residue with several portions of ether, combining the ether extracts and decanted solvent layer, and evaporating the solvent. Other conventional procedures for the hydrolysis can be used if desired, and other organic solvents can be used in place of ether.

The free bases thus obtained can be further purified if desired, e. g., by conventional procedures such as recrystallization, rectification, or conversion to a salt. For example, a preferred manner of procedure resides in reacting an ether extract containing the free base, without separation of the solvent, with a stoichiometric quantity of an acid, such as hydrochloric, hydrobromic, sulfuric, acetic, tartaric, citric, or the like, to form the 3-(2-aminoethyl)-indole acid addition salt. In this manner, the free base can be separated as its crystalline salt, e. g., hydrochloride, which usually precipitates from the solution. Similarly, a quaternary ammonium salt can also be prepared by reacting a tertiary amine free base with an alkyl halide or aralkyl halide and such quaternary ammonium salts include the methochloride, ethobromide, benzyl chloride, and the like. Alternatively the free base can be isolated by removal of the solvent and admixed with a stoichiometric quantity of an acid, e. g., hydrochloric acid, to form the corresponding acid addition salt, or the isolated tertiary amine free base can be mixed with an alkyl halide or aralkyl halide to form the quaternary ammonium salt of the 3-(2-aminoethyl)-indole employed. The 3-(2-aminoethyl)-indole salts, so obtained, can be removed by filtration and so utilized, or the resulting salt precipitate may be further purified, if desired, by recrystallizing from alcohol-water solutions such as methanol-water, ethanol-water, isopropanol-water, and the like, with ethanol-water being preferred.

The reduction of the starting 3-indoleglyoxylamides can also be accomplished in a stepwise manner, if so desired. For example, the ring-attached carbonyl group of the starting 3-indoleglyoxylamide can be partially reduced to a carbinol group by utilizing reducing agents other than lithium aluminum hydride, e. g., sodium borohydride, lithium borohydride, aluminum amalgam, and catalytic means such as platinum oxide. Further reduction of the intermediate 3-indolegylcolamide with lithium aluminum hydride according to the process of the present invention will produce the desired 3-(2-aminoethyl)-indole.

Many compounds produced by the novel process of the present invention possess varied and useful pharmacological activity, and others are important intermediates in the preparation of pharmacologically active compounds.

The 4-, 5-, 6-, and 7-substituted benzyloxy and alkoxy-3-(2-aminoethyl)-indoles produced by the process of the present invention are valuable intermediates in the preparation of hydroxy-3-(2-aminoethyl)-indoles including serotonin, i. e., 5-hydroxy-3-(2-aminoethyl)-indole. Serotonin was originally reported by Rapport [J. Biol. Chem. 180, 961 (1949)] and shown to possess vasoconstrictor properties. The other hydroxy-3-(2-aminoethyl)-indoles also possess vasoconstrictor activity. The hydroxy-3-(2-aminoethyl)-indoles are prepared from the 4-, 5-, 6-, or 7-benzyloxy or alkoxy substituted 3-(2-aminoethyl)-indoles of the present invention by debenzylation or dealkylation, respectively. The debenzylation of the benzyloxy-3-(2-amino-ethyl)-indoles is carried out by hydrogenolysis in the presence of a catalyst, advantageously palladium on charcoal, as more fully disclosed in copending application Serial Number 289,872, filed May 24, 1952. The alkoxy-3-(2-aminoethyl)-indoles are dealkylated with aluminum chloride according to the procedure outlined by Asero et al. [Ann. 576, 69–74 (1952)]. The reduction of 4-, 5-, 6-, or 7-acyloxy substituted 3-indolegyloxylamides according to the process of the present invention results in the reduction of the carbonyl groups of the gyloxylamide fragment and also results in the simultaneous deacylation of the indole, to prepare pharmacologically active hydroxy-3-(2-aminoethyl)-indoles. The non-hydroxylated tryptamines, e. g., halo-3-(2-aminoethyl) - indoles, aminoethyl - 3 - (2 - aminoethyl) - indoles, methylol - 3 - (2 - aminoethyl) - indoles, dialkylamino - 3 - (2 - aminoethyl) - indoles, 3 - (2 - aminoethyl) - indoles, alkyl - 3 - (2 - aminoethyl) - indoles, aryl - 3 - (2 - aminoethyl) - indoles, aralkyl - 3 - (2 - aminoethyl) - indoles, aryloxy - 3 - (2 - aminoethyl) - indoles, and fused arylene (e, f, and g) 3-(2-aminoethyl)-indoles, produced by the process of the present invention have diuretic, oxytocic, antioxytocic, antibacterial and hypnotic properties. The monosubstituted amino indoles, e. g., 3-(2-N-methylaminoethyl)-indole, have peculiarly enough oxytocic properties whereas the disubstituted amino indoles, e. g., 3-(2-N,N-diethylaminoethyl)-indole, have antioxytocic properties. In addition the amines produced by the present invention have also demonstrated potent depressor activity.

The tryptamines of the present invention are also useful in the preparation of pickling inhibitors as more fully disclosed in U. S. Patent 2,586,331, issued February 19, 1952.

The following examples are illustrative of the process and products of the present invention, but are not to be construed as limiting.

*Example 1.—5-benzyloxy-3-(2-N,N-dibenzylaminoethyl)-indole hydrochloride*

To a solution of 17.6 grams (0.079 mole) of 5-benzyloxyindole in 800 milliliters of anhydrous ether was added a solution of 9.6 grams (0.076 mole) of oxalyl chloride in 100 milliliters of dry ether. A light yellow precipitate began to separate from the ether solution after about fifteen minutes; after four hours the mixture was cooled in an ice bath and the yellow precipitate recovered by filtration. After washing with several portions of dry ether, the compound was dried in a vacuum desiccator. The yield of crystalline 5-benzyloxy-3-indoleglyoxylyl chloride was fourteen grams, a yield of approximately 88 percent, and the compound melted between 146 and 150 degrees centigrade.

A 5.8 gram sample (0.02 mole) of 5-benzyloxy-3-indole-glyoxylyl chloride dissolved in 100 milliliters of dry benzene was added to 11.8 grams (0.06 mole) of dibenzylamine. After the first exothermic reaction moderated, the mixture was heated for thirty minutes on the steam bath, and thereupon filtered. The filtrate was concentrated and the solid was twice recrystallized from isopropanol. A yield of 8.5 grams (91 percent of theoretical) of 5-benzyloxy-N,N-dibenzyl-3-indoleglyoxylamide melting at 150–151 degrees centigrade was obtained.

*Analysis.*—Calc. for $C_{31}H_{26}N_2O_3$: C, 78.67; H, 5.52; N, 5.90. Found: C, 78.40; H, 5.52; N, 5.68.

A six gram sample of 5-benzyloxy-N,N-dibenzyl-3-indoleglyoxylamide was dissolved in 150 milliliters of anhydrous tetrahydrofuran. The resulting solution was added dropwise to 3.7 grams (0.1 mole) of lithium aluminum hydride dissolved in 100 milliliters of tetrahydrofuran, whereafter the mixture was refluxed for one hour and concentrated to a volume of fifty milliliters. The concentrated mixture was cooled in an ice bath while adding 800 milliliters of ether with stirring. Fifty milliliters of a ten percent solution of sodium hydroxide was added, whereupon the aluminum and lithium residues separated with the alkali as a viscous lower layer. The supernatant ethereal solution was separated and the alkali layer was vigorously stirred with several 200 milliliter portions of ether to extract the desired product. The combined ether solutions were washed with water and shaken with ten milliliters of hydrochloric acid diluted with thirty milliliters of water, whereupon a voluminous precipitate separated. The precipitate was filtered, washed with ether and dried to yield 6.2 grams (98 percent yield) of 5-benzyloxy-3-(2-N,N-dibenzylaminoethyl)-indole hydrochloride. The product melted at 231–232 degrees centigrade after one recrystallization from ethanol.

*Example 2.—5-benzyloxy-3-(2-N-benzylaminoethyl)-indole hydrochloride*

In essentially the same manner as disclosed in Example 1, 5-benzyloxy-3-(2-N-benzylaminoethyl)-indole hydrochloride is prepared by reducing 5-benzyloxy-N-benzyl-3-indoleglyoxylamide having a melting point of 201–202 degrees centigrade, in lieu of the 5-benzyloxy-N,N-dibenzyl-3-indoleglyoxylamide of Example 1.

*Example 3.—3-(2-aminoethyl)-indole (tryptamine)*

To a 25 gram sample of indole dissolved in 500 milliliters of anhydrous ether at room temperature was added 25 milliliters of oxalyl chloride. After the vigorous action had subsided the precipitate was filtered and washed with ether. The precipitate, 3-indoleglyoxylyl chloride, was added to 700 milliliters of anhydrous ether in a one liter flask and cooled to between zero degrees and ten degrees centigrade. Anhydrous ammonia was added thereto with stirring until the yellow color disappeared, the precipitate stirred for two additional hours, slurried one hour in 500 milliliters of water, and then the precipitate was collected and washed thoroughly with water. After drying the 3-indoleglyoxylamide weighed 33.7 grams (92.4 percent).

The above prepared amide was placed in the thimble of a Soxhlet extractor. The amide was extracted for about ten hours into a boiling mixture of 2000 milliliters of tetrahydrofuran and 44.5 grams of lithium aluminum hydride. The mixture was cooled and a solution of 54 milliliters of water and 375 milliliters of tetrahydrofuran was carefully added over four hours, followed by a solution of 40 grams of sodium hydroxide and 200 milliliters of water. After standing for about twenty minutes the mixture was filtered and the precipitate thoroughly washed with ether. The desired 3-(2-aminoethyl)-indole distilled at 148–150 degrees centigrade at a pressure of 0.07 millimeter of mercury. The crude material melted at 109–115 degrees centigrade and after recrystallization from ethyl acetate the product melted at 115–117 degrees centigrade, and the overall yield was 35.1 percent.

*Analysis.*—Calc. for $C_{10}H_{12}N_2$: C, 74.95; H, 7.55; N, 17.48. Found: C, 75.45; H, 7.27; N, 17.42.

*Example 4.—3-(2-N-benzyl-N-ethylaminoethyl)-indole hydrochloride*

Thirty grams of 3-indoleglyoxylyl chloride, prepared in the manner disclosed in Example 3, was added to a solution of 47.25 grams of N-benzyl-N-ethylamine in 300 milliliters of benzene. The mixture became hot and a precipitate of N-benzyl-N-ethylamine hydrochloride slowly separated; after two hours at room temperature the salt was filtered and the solution concentrated. The resulting crude oil, 28 grams, was washed with dilute hydrochloric acid and benzene, dissolved in tetrahydrofuran, and dried for about eight hours over potassium carbonate. The dried solution was added dropwise to 7.4 grams of lithium aluminum hydride dissolved in 200 milliliters of tetrahydrofuran. The resulting mixture was hydrolyzed with ether and a ten percent solution of sodium hydroxide, and the ether-tetrahydrofuran layer was decanted and concentrated, and to the concentrate in ether was added a stream of dry hydrogen chloride gas to produce the crystalline 3-(2-N-benzyl-N-ethylaminoethyl)-indole hydrochloride. The hydrochloride was recrystallized from ethanol and melted at 224–225 degrees centigrade.

*Analysis.*—Calc. for $C_{19}H_{23}ClN_2$: C, 72.48; H, 7.36; N, 8.87. Found: C, 72.19; H, 7.20; N, 8.76.

*Example 5.—3-(2-N,N-diethylaminoethyl)-indole hydrochloride*

In essentially the same manner as disclosed in Example 3, 3-(2-N,N-diethylaminoethyl)-indole hydrochloride is produced by reducing N,N-diethyl-3-indoleglyoxylamide which has a melting point of 168.5–169.5 degrees centigrade, with lithium aluminum hydride.

*Example 6.—3-(2-N-benzylaminoethyl)-indole hydrochloride*

A 17.9 gram sample of 3-indoleglyoxylyl chloride, prepared as disclosed in Example 3, was added in small portions to a cold, stirred solution of 42.8 grams of benzylamine and 300 milliliters of anhydrous ether. After a period of about 20 hours a solution of 21.2 grams of sodium carbonate and fifty milliliters of water was added, the mixture slurried thirty minutes, and thereupon filtered. The recovered precipitate was then stirred two hours in fifteen hundred milliliters of water containing five grams of sodium carbonate and two hundred milliliters of Skellysolve B. The product, N-benzyl-3-indoleglyoxylamide, was collected, washed with water, and dried. A yield of 21.1 grams was obtained and the product melted at 172–173.5 degrees centigrade.

*Analysis.*—Calc. for $C_{17}H_{14}N_2O_2$: C, 73.36; H, 5.07; N, 10.07. Found: C, 73.66; H, 5.11; N, 10.33.

A 21.1 gram sample of N-benzyl-3-indoleglyoxylamide was dissolved in 150 milliliters of tetrahydrofuran and added over a fifty minute period to a refluxing mixture of one thousand milliliters of tetrahydrofuran and 22 grams of lithium aluminum hydride. After refluxing sixteen hours the mixture was thoroughly cooled, a solution of 54 milliliters of water and 375 milliliters of tetrahydrofuran added thereto, followed by a solution of forty grams of sodium hydroxide and 200 milliliters of water. After standing for a period of about twenty minutes, the mixture was filtered and the precipitate thoroughly washed with ether. The dry, crude product was dissolved in dry ether and anhydrous hydrogen chloride was added thereto. The resulting precipitate was extracted with a small volume of hot isopropanol and the residue, 3-(2-N-benzylaminoethyl)-indole hydrochloride, weighed eleven grams and after recrystallization from a large volume of isopropanol melted at 232.5–233.5 degrees centigrade.

*Example 7.—3-(2-N,N-dibenzylaminoethyl)-indole hydrochloride*

In essentially the same manner as disclosed in Example 6, 3-(2-N,N-dibenzylaminoethyl)-indole hydrochloride is prepared utilizing dibenzylamine in lieu of the benzylamine of Example 6. The product melted at 207.5–208 degrees centigrade and was obtained in 82.7 percent yield.

*Example 8.—3-(2-N-morpholinylethyl)-indole*

A solution of fifty grams of indole and 1250 milliliters of anhydrous ether was mixed with 45 milliliters of oxalyl chloride. After about thirty minutes the precipitate was collected and added to one thousand milliliters of anhydrous benzene containing 135.5 grams of morpholine; the resulting paste was vigorously stirred for one hour, and 75 milliliters of water was added thereto. The resulting precipitate was collected after stirring for about thirty minutes, washed thoroughly with benzene, slurried in water, filtered and dried. The yield of 3-indoleglyoxylic acid morpholine was 101.3 grams which melted at 182–184 degrees centigrade after recrystallization from alcohol.

A solution of 10.1 grams of 3-indoleglyoxylic acid morpholide and 250 milliliters of tetrahydrofuran was added over a period of about two and one half-hours to a mixture of 5.7 grams of lithium aluminum hydride and 600 milliliters of ether. After the addition was completed an additional one gram of lithium aluminum hydride was added. The reaction mixture was refluxed for about three hours, wet ether and dilute sodium hydroxide added, whereafter the solvent layer was decanted and the solid residue thoroughly washed with ether. The combined solvents were concentrated to dryness to yield 8.9 grams of 3-(2-N-morpholinylethyl)-indole, which after recrystallization from ethyl acetate melted at 142.5–145 degrees centigrade.

*Example 9.—5-benzyloxy-3-(2-N,N-dimethylaminoethyl)-indole hydrochloride*

A twelve gram sample of 5-benzyloxy-3-indoleglyoxylyl chloride, prepared as disclosed in Example 1, was suspended in 200 milliliters of dry benzene, and through the suspension was passed a stream of dimethylamine gas. The orange acid chloride went into solution, and after about thirty minutes the gas stream was stopped and the mixture concentrated under reduced pressure. The resulting residue was recrystallized from isopropanol and after three recrystallizations the product, 5-benzyloxy-N,N-dimethyl-3-indoleglyoxylamide, melted at 179–180.5 degrees centigrade and weighed twelve grams.

*Analysis.*—Calc. for $C_{19}H_{18}N_2O_3$: C, 70.80; H, 5.62; N, 8.69. Found: C, 70.65; H, 5.41; N, 8.34.

Ten grams of 5-benzyloxy-N,N-dimethyl-3-indoleglyoxylamide was dissolved in 200 milliliters of tetrahydrofuran and the resulting solution added to 3.7 grams of lithium aluminum hydride dissolved in 200 milliliters of tetrahydrofuran. After two hours of refluxing, the mixture was cooled in an ice bath, and the excess lithium aluminum hydride destroyed through the addition of wet ether followed by fifty milliliters of ten percent sodium hydroxide solution. The solvent layer was decanted and the hydroxide precipitate washed with ether. The combined solvents were then concentrated, whereupon the remaining oil solidified. The solid was dissolved in ether and dry hydrogen chloride passed into the solution, and the 5-benzyloxy-3-(2-N,N-dimethylaminoethyl)-indole hydrochloride which separated was recrystallized from isopropanol and melted at 153–155 degrees centigrade.

*Analysis.*—Calc. for $C_{19}H_{23}ClN_2O$: C, 68.96; H, 7.00; N, 8.46; Cl, 10.71. Found: C, 68.97; H, 6.87; N, 8.21; Cl, 10.76.

*Example 10.—5-benzyl-3-(2-N-benzyl-N-ethylaminoethyl)-indole hydrochloride*

In essentially the same manner as shown in Example 1, 5-benzyl-3-(2-N-benzyl-N-ethylaminoethyl)-indole hydrochloride is prepared by reducing 5-benzyl-N-benzyl-N-ethyl-3-indole-glyoxylamide with lithium aluminum hydride.

*Example 11.—5-phenoxy-3-(2-N,N-diethylaminoethyl)-indole sulfate*

In essentially the same manner as shown in Example 1, 5-phenoxy-3-(2-N,N-diethylaminoethyl)-indole sulfate is prepared by reducing 5-phenoxy-N,N-diethyl-3-indoleglyoxylamide with lithium aluminum hydride.

*Example 12.—2,5-diphenyl-3-(2-N,N-diphenylaminoethyl)-indole hydrochloride*

In essentially the same manner as shown in Example 1, 2,5-diphenyl-3-(2-N,N-diphenylaminoethyl)-indole hydrochloride is prepared by reducing 2,5-diphenyl-N,N-diphenyl-3-indoleglyoxylamide with lithium aluminum hydride.

Example 13.—4-methyl-3-(2-N-phenylaminoethyl)-indole hydrochloride

In essentially the same manner as shown in Example 1, 4-methyl-3-(2-N-phenylaminoethyl)-indole hydrochloride is prepared by reducing 4-methyl-N-phenyl-3-indoleglyoxylamide with lithium aluminum hydride.

Example 14.—5,6-dimethoxy-3-(2-N,N-dibenzylaminoethyl)-indole hydrochloride

In essentially the same manner as shown in Example 1, 5,6-dimethoxy-3-(2-N,N-dibenzylaminoethyl)-indole hydrochloride is produced by reducing 5,6-dimethoxy-N,N-dibenzyl-3-indoleglyoxylamide which has a melting point of 193–194 degrees centigrade, with lithium aluminum hydride.

Example 15.—5-benzyloxy-3-(2-anilinoethyl)-indole

A suspension of 5.8 grams of 5-benzyloxy-3-indoleglyoxylyl chloride, prepared as disclosed in Example 1, in 100 milliliters of dry benzene was mixed with 9.3 grams of aniline. The mixture was warmed on the steam bath for one hour whereupon the benzene distilled. The solid residue was filtered, washed with dilute acid and water, and recrystallized from ethanol. The yield of product, 5-benzyloxy-3-indoleglyoxylanilide, was seven grams and the product melted at 249–250 degrees centigrade.

*Analysis.*—Calc. for $C_{23}H_{18}N_2O_3$: C, 74.58; H, 4.90; N, 7.56. Found: C, 74.55; H, 4.92; N, 7.66.

Seven grams of the 5-benzyloxy-3-indoleglyoxylanilide was suspended in 100 milliliters of tetrahydrofuran. This suspension was added with stirring to a solution of 3.7 grams of lithium aluminum hydride in 100 milliliters of tetrahydrofuran. The mixture was concentrated to a volume of 100 milliliters under nitrogen and was cooled in an ice bath. The cooled mixture was diluted with 700 milliliters of ether to destroy the excess lithium aluminum hydride, and on the addition of fifty milliliters of ten percent sodium hydroxide two layers separated. The ether layer was decanted and the lower alkali layer extracted with several 200-milliliter portions of ether. The combined ether solutions were washed with water and extracted with dilute hydrochloric acid, whereupon a red oil separated which was insoluble in the acid and ether layers. On standing for a period of about ten hours the oil solidified and was filtered. The resulting precipitate was recrystallized from ethanol containing a small amount of hydrochloric acid to yield 6.8 grams of the desired product, 5-benzyloxy-3-(2-anilinoethyl)-indole, which melted at 184–185 degrees centigrade.

*Analysis.*—Calc. for $C_{23}H_{23}N_2O$: C, 72.90; H, 6.12; N, 7.39. Found: C, 72.85; H, 6.06; N, 7.35.

Example 16.—3-[2-N-benzyl-N-(2-ethylhexyl)-aminoethyl]-indole hydrochloride

A suspension of 20.7 grams of 3-indoleglyoxylyl chloride, prepared as disclosed in Example 3, in 200 milliliters of benzene was reacted with 45.9 grams of N-benzyl-N-2-ethylhexylamine. The mixture was concentrated and the resulting oil washed with warm water and dilute sodium hydroxide solution. The crude oil was dissolved in tetrahydrofuran and dried over potassium carbonate and added to a solution of twenty grams of lithium aluminum hydride dissolved in tetrahydrofuran. The reaction mixture was refluxed for about three hours followed by the addition of wet ether and dilute sodium hydroxide. The solution was decanted and the solid thoroughly washed with ether, and the combined filtrates were concentrated. The remaining oil solidified and was dissolved in ether and dry hydrogen chloride added thereto. The resulting precipitate 3-[2-N-benzyl-N-(2-ethylhexyl)-aminoethyl]-indole hydrochloride melted at 173–174 degrees centigrade.

*Analysis.*—Calc. for $C_{25}H_{35}ClN_2$: C, 75.25; H, 8.84; N, 7.02. Found: C, 75.29; H, 8.94; N, 6.86.

Example 17.—2-methyl-3-(2-N-hexamethyleneiminoethyl)-indole hydrochloride

A 10.7 gram sample of 2-methyl-3-indoleglyoxylyl chloride, prepared as described in Example 1, was suspended in 75 milliliters of benzene and 9.9 grams of hexamethyleneimine added thereto. The mixture became warm and a heavy precipitate of amine salt separated. The precipitate was filtered after one hour and the remaining filtrate concentrated under reduced pressure. The remaining oil was crystallized from isopropanol at zero degrees centigrade and after two recrystallizations from isopropanol the product 2-methyl-N-hexamethylene-3-indoleglyoxylamide melted at 157–158 degrees centigrade.

*Analysis.*—Calc. for $C_{17}H_{20}N_2O_2$: C, 71.81; H, 7.09; N, 9.85. Found: C, 72.22; H, 6.94; N, 9.93.

A 1.4 gram sample of 2-methyl-N-hexamethylene-3-indoleglyoxylamide was reduced in tetrahydrofuran using one gram of lithium aluminum hydride. Ether was added to destroy excess lithium aluminum hydride followed by a small amount of ten percent sodium hydroxide and the resulting clear solvent layer was decanted, dried, and concentrated. The remaining oil was dissolved in ether and saturated with dry hydrogen chloride. The salt which precipitated therefrom was recrystallized from isopropanol and after two purifications 1.2 grams of 2-methyl-3-(2-N-hexamethyleneiminoethyl)-indole hydrochloride was obtained and melted at 252–254 degrees centigrade.

*Analysis.*—Calc. for $C_{17}H_{25}ClN_2$: C, 69.72; H, 8.60; N, 9.56. Found: C, 69.82; H, 8.58; N, 9.60.

Example 18.—5,6-dimethoxy-3-(2-N-hexamethyleneiminoethyl)-indole hydrochloride In essentially the same manner as shown in Example 17, 5,6-dimethoxy-N-hexamethylene-3-indoleglyoxylamide, melting at 182–184 degrees centigrade, is reduced with lithium aluminum hydride to produce 5,6-dimethoxy-3-(2-N-hexamethyleneiminoethyl)-indole hydrochloride.

Example 19.—1-benz-(g)-3-(2-piperidylethyl)-indole hydrochloride

A solution of two grams of 1-benz-(g)-indole in fifty milliliters of anhydrous ether was reacted with two grams of oxalyl chloride. The solution turned red and after about five minutes needle-like crystals begin to separate from the ether solution and after about two hours at about 23 degrees centigrade the crystals were filtered. The crystalline product 1-benz-(g)-3-indoleglyoxylyl chloride was dried in vacuum and melted at 178–180 degrees centigrade.

Two grams of 1-benz-(g)-3-indoleglyoxylyl chloride was added to ten grams of piperidine in fifty milliliters of benzene, and a resulting white precipitate separated. The precipitate was filtered after about one hour and after two recrystallizations 1.8 grams of 1-benz-(g)-3-indoleglyoxylic acid piperidide was obtained which melted at 231–233 degrees centigrade.

*Analysis.*—Calc. for $C_{19}H_{18}N_2O_2$: C, 74.49; H, 5.92; N, 9.11. Found: C, 74.75; H, 5.81; N, 9.08.

Two grams of the 1-benz-(g)-3-indoleglyoxylic acid piperidide was dissolved in 100 milliliters of dry tetrahydrofuran and to this solution was added 1.5 grams of lithium aluminum hydride dissolved in fifty milliliters of tetrahydrofuran. The yellow reaction mixture was refluxed for four hours, cooled, and the excess lithium aluminum hydride destroyed through the addition of 300 milliliters of U. S. P. ether, and fifty milliliters of ten percent sodium hydroxide was added to coagulate the flocculent hydroxide precipitate. The solvent layer was decanted, dried over potassium carbonate, and concentrated. The resulting oil was dissolved in dry ether, and the solution saturated with dry hydrogen chloride. The gummy precipitate was heated with isopropanol and recrystallized from the solvent. The resulting 1-benz- (g)-3-(2-piperidylethyl)-indole hydrochloride melted at 229–231 degrees centigrade. The free base crystallized from isopropanol melted at 110–112 degrees centigrade.

*Example 20.—3-(2-N-methylaminoethyl)-indole hydrochloride*

Five grams of N-methyl-3-indoleglyoxylamide, prepared as described in Example 3, was suspended in 300 milliliters of ethanol and to the suspension was added 0.3 gram of Adams' platinum oxide catalyst. The mixture was shaken under 54 pounds of hydrogen pressure. Moderately rapid adsorption occurred, and when the theoretical amount of hydrogen had been absorbed a clear solution was observed. The mixture was heated to boiling and filtered to produce N-methyl-3-indoleglycolamide melting at 193–194 degrees centigrade.

Two grams of N-methyl-3-indoleglycolamide was dissolved in fifty milliliters of tetrahydrofuran and to this solution was added one gram of lithium aluminum hydride dissolved in fifty milliliters of tetrahydrofuran. The resulting mixture was refluxed for two hours and hydrolyzed with U. S. P. ether and ten percent sodium hydroxide solution. The solvent layer was decanted and concentrated under reduced pressure; the remaining oil was dissolved in dry ether and saturated with dry hydrogen chloride. The resulting precipitate, 3-(2-N-methylaminoethyl)-indole hydrochloride, was recrystallized from ethanol and melted at 176–177 degrees centigrade.

*Analysis.*—Calc. for $C_{11}H_{15}ClN_2$: C, 62.70; H, 7.17; N, 13.20. Found: C, 62.64; H, 7.16; N, 13.70.

*Example 21.—6-methoxy-3-[2-(7-hydroxy-2-decahydroisoquinolyl)-ethyl]-indole*

Fourteen and six-tenth grams (0.1 mole) of 6-methoxyindole was dissolved in 400 milliliters of dry ether. The solution was cooled in an ice-bath and 12.6 grams (0.1 mole) of oxalyl chloride added in 100 milliliters of ether. The bright yellow precipitate which slowly separated was filtered after four hours and washed with ether. The precipitate of 6-methoxy-3-indoleglyoxylyl chloride thus obtained was added in small portions to a solution of 31 grams (0.2 mole) of 7-hydroxy-decahydroisoquinoline. [Prepared by hydrogenating 7-hydroxyisoquinoline, Woodward et al., J. A. C. S. 67, 860 (1945)]. The precipitate of amine hydrochloride was filtered and washed with benzene. The filtrate was concentrated and the gum crystallized from isopropanol. Without further purification the 2-(6-methoxy-3-indoleglyoxylyl) - 7 - hydroxy - decahydroisoquinoline was dissolved in tetrahydrofuran and the mixture was added to 7.4 grams (0.2 mole) of lithium aluminum hydride dissolved in 300 milliliters of tetrahydrofuran. After refluxing for three hours the mixture was cooled and hydrolyzed with wet ether followed by fifty milliliters of ten percent sodium hydroxide. The ether-tetrahydrofuran layer was decanted and concentrated to obtain 6-methoxy-3-[2-(7-hydroxy-2-decahydroisoquinolyl)-ethyl]-indole.

*Example 22.—3-(2-N-benzylaminoethyl)-indole hydrochloride*

Five grams of N-benzyl-3-indoleglyoxylamide prepared as described in Example 6, was suspended in 300 milliliters of ethanol and 0.3 gram of Adams' platinum oxide catalyst added. The mixture was shaken under hydrogen pressure of 55 pounds, and when the hydrogen uptake halted the mixture was heated to boiling and filtered. The crystals which separated on cooling melted at 180–181 degrees centigrade with gas evolution. Recrystallization from ethyl acetate - dimethylformamide gave N-benzyl-3-indoleglycolamide melting at 181–182 degrees centigrade.

Three grams of N-benzyl-3-indoleglycolamide in 100 milliliters of tetrahydrofuran was added to one gram of lithium aluminum hydride in 100 milliliters of tetrahydrofuran. The mixture was refluxed for two hours, hydrolyzed with ether followed by a ten percent sodium hydroxide solution, and the resulting solvent layer was decanted and concentrated under reduced pressure. The remaining solid was dissolved in ether and the resulting solution saturated with dry hydrogen chloride, to produce 3-(2-N-benzylaminoethyl)-indole hydrochloride melting at 232–233 degrees centigrade.

*Analysis.*—Calc. for $C_{17}H_{19}ClN_2$: C, 71.16; H, 6.67; N, 9.80. Found: C, 71.15; H, 6.43; N, 9.99.

*Example 23.—6-hydroxy-3-(2-N-cyclohexylaminoethyl)-indole hydrochloride*

In essentially the same manner as shown in Example 1, 6-hydroxy-3-(2-N-cyclohexylaminoethyl)-indole hydrochloride is prepared by reducing 6-acetoxy-N-cyclohexyl-3-indoleglyoxylamide with lithium aluminum hydride.

*Example 24.—4-aminomethyl-2-methyl-3-(2-aminoethyl)-indole sulfate*

In essentially the same manner as shown in Example 1, 4-aminomethyl-2-methyl-3-(2-aminoethyl)-indole sulfate is prepared by reducing 4-cyano-2-methyl-3-indoleglyoxylamide with lithium aluminum hydride.

*Example 25.—5-methylol-2-phenyl-3-(2-N,N-diphenylaminoethyl)-indole hydrochloride*

In essentially the same manner as shown in Example 1, 5-methylol-2-phenyl-3-(2-N,N-diphenylaminoethyl)-indole hydrochloride is prepared by reducing 5-carbethoxy-2-phenyl-N,N-diphenyl-3 - indoleglyoxylamide with lithium aluminum hydride.

*Example 26.—methylol-2-(para-chlorobenzyl)-3-(2-N,N-dibenzyl-aminoethyl)-indole hydrochloride*

In essentially the same manner as shown in Example 1, 5 - methylol - 2 - (para - chlorobenzyl) - 3 - (2 - N,N - dibenzylaminoethyl)-indole hydrochloride is prepared by reducing 5 - carboxy - 2 - (para - chlorobenzyl) - N,N - dibenzyl-3-indoleglyoxylamide with lithium aluminum hydride.

*Example 27.—4-chloro-3-(2-N,N-dibenzylaminoethyl)-indole hydrochloride*

In essentially the same manner as shown in Example 1, 4-chloro-3-(2-N,N-dibenzylaminoethyl)-indole hydrochloride is prepared by reducing 4-chloro-N,N-dibenzyl-3-indoleglyoxylamide which has a melting point of 191–193 degrees centigrade, with lithium aluminum hydride.

*Example 28.—5-(N,N-diethylamino)-2-ethyl-3-(2-N,N-dibutylaminoethyl)-indole hydrochloride*

In essentially the same manner as shown in Example 1, 5-(N,N-diethylamino)-2-ethyl-3-(2-N,N-dibutylaminoethyl)-indole hydrochloride is prepared by reducing 5-(N,N - diethylamino) - 2 - ethyl - N,N - dibutyl - 3 - indoleglyoxylamide with lithium aluminum hydride.

In essentially the same manner as disclosed in the above examples the following 3-(2-aminoethyl)-indoles are prepared by reducing the corresponding 3-indoleglyoxylamides: 3-(2-N-benzyl-N-cyclohexylaminoethyl)-indole, 3-(2-N-benzyl-N-n-propylaminoethyl)-indole, 3-(2-N-benzyl-N-n-butylaminoethyl)-indole, 3-(2-N-benzyl-N-isobutylaminoethyl)-indole, 3-(2-N-benzyl-N-sec. butylaminoethyl)-indole, 3 - (2-N-cyclohexylaminoethyl)-indole, 4-hydroxytryptamine, 5-methoxytryptamine, 5-(para - methylbenzyloxy)-tryptamine, 5 - ethoxy-2-tolyl-tryptamine, 5 - methoxy - 2 - phenyltryptamine, 7 - benzhydryloxytryptamine, 5 - benzhydryloxytryptamine, 5 - (para - chlorobenzyloxy) - tryptamine, 5 - (para,para'-dimethoxybenzhydryloxy) - 2 - methyltryptamine, 4 - propoxy - 2 - (para-ethylbenzyl) - 3 - (2 - N - piperidylethyl) - indole, 5 - benzyloxy - 2 - naphthyltryptamine, 4 - benzhydryloxy - 2 - (2 - ethoxynaphthyl) - tryptamine, 5 - ethoxy - 2 - (2 - chloronaphthyl) - tryptamine, 7-butoxy - 2 - propyltryptamine, 4 - chlorotryptamine, 5-methylol-2-hexyltryptamine, 5-aminomethyltryptamine, 7-aminomethyl-2-tolyltryptamine, 6-methylol-2-(2-methylnaphthyl) - tryptamine, 4,5 - dimethoxy - 2 - methyltryptamine, 4,7 - dimethylol - 2 - ethyltryptamine, 5 - benzyloxy - 6 - chlorotryptamine, 5 - (N,N - diethylamino)-tryptamine, 6 - (N,N - dimethylamino) - 2 - methyltryptamine, 4 - (N,N-dipropylamino) - 3 - (2 - N - benzylaminoethyl) - indole, 5,7 - dichlorotryptamine, 6,7 - dibenzyloxy - 3 - (2 - N,N - dibenzylaminoethyl) - indole, 6 - methylol - 2 - phenylpropyltryptamine, 7 - aminomethyl - 3 - (2 - N - methylaminoethyl) - indole, 4-methylol - 2 - phenyltryptamine, 6 - hydroxy - 2 - phenethyltryptamine, 7 - methoxy - 2 - benzyl - 3 - (2 - N-benzylaminoethyl) - indole, 5 - hydroxytryptamine, 4-hydroxy - 3 - (2 - N,N - dibenzylaminoethyl) - indole, 6 - hydroxy - 7 - methoxy - 3 - (2 - N,N - dibenzylaminoethyl) - indole, 7 - methyltryptamine, 2 - hexyl - 3 - (2-N - phenethylaminoethyl) - indole, 2,4 - diphenyltryptamine, 6 - naphthyloxy - 3 - (2 - N - ethylaminoethyl)-indole, 6 - phenethyltryptamine, 1 - benz - (f) - 3 - (2-N,N - dibenzylaminoethyl) - indole, 6 - benzyl - 3 - (2-N-butylaminoethyl) - indole, 2,4,7 - trimethyl - 3 - (2-N-propylaminoethyl)-indole, and the like.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. In a process for the preparation of 3-(2-aminoethyl)-indoles including acid addition salts thereof, the step of reducing with lithium aluminum hydride a 3-indoleglyoxylamide having the formula:

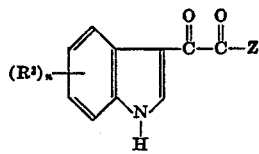

wherein $R^3$ is a benzyloxy radical, $n$ is an integer from one to four, and Z is an amido radical.

2. In a process for the preparation of 3-(2-aminoethyl)-indoles including acid addition salts thereof, the step of reducing with lithium aluminum hydride a 3-indoleglyoxylamide having the formula:

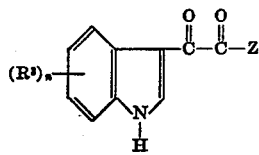

wherein $R^3$ is an acyloxy radical wherein the acyl substituent is from an organic carboxylic acid, $n$ is an integer from one to four, and Z is an amido radical.

3. In a process for the preparation of 3-(2-aminoethyl)-indoles including acid addition salts thereof, the step of reducing with lithium aluminum hydride a 3-indoleglyoxylamide having the formula:

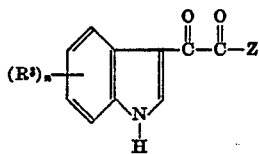

wherein $R^3$ is a lower-alkoxy radical, $n$ is an integer from one to four, and Z is an amido radical.

4. In a process for the preparation of 3-(2-aminoethyl)-indoles including acid addition salts thereof, the step of reducing with lithium aluminum hydride a 3-indoleglyoxylamide having the formula:

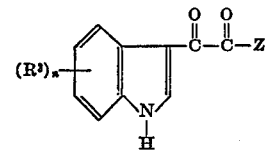

wherein $R^3$ is a halogen, $n$ is an integer from one to four, and Z is an amido radical.

5. In a process for the preparation of 3-(2-aminoethyl)- indoles including acid addition salts thereof, the step of reducing with lithium aluminum hydride a 3-indoleglyoxylamide having the formula:

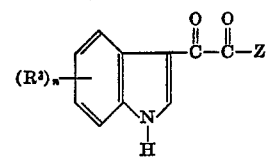

wherein $R_3$ is a lower-alkyl radical, $n$ is an integer from one to four, and Z is an amido radical.

6. In a process for the preparation of 5-benzyloxy-3-(2-N,N-dibenzylaminoethyl)-indole including acid addition salts thereof, the step of reducing 5-benzyloxy-N,N-dibenzyl-3-indoleglyoxylamide with lithium aluminum hydride.

7. In a process for the preparation of 5-benzyloxy-3-(2-N-benzylaminoethyl)-indole including acid addition salts thereof, the step of reducing 5-benzyloxy-N-benzyl-3-indoleglyoxylamide with lithium aluminum hydride.

8. In a process for the preparation of 3-(2-aminoethyl)-indole including acid addition salts thereof, the step of reducing 3-indoleglyoxylamide with lithium aluminum hydride.

9. In a process for the preparation of 3-(2-N-benzyl-N-methylaminoethyl)-indole including acid addition salts thereof, the step of reducing N-benzyl-N-methyl-3-indoleglyoxylamide with lithium aluminum hydride.

10. In a process for the preparation of 3-(2-N,N-diethylaminoethyl)-indole including acid addition salts thereof, the step of reducing N,N-diethyl-3-indoleglyoxylamide with lithium aluminum hydride.

11. In a process for the preparation of 3-(2-aminoethyl)-indoles including acid addition salts thereof, the steps of reducing the ring-attached carbonyl group of 3-indoleglyoxylamides to a carbinol group, and then reducing the thus-produced compound with lithium aluminum hydride to produce the desired 3-(2-aminoethyl)-indole.

12. In a process for the preparation of 3-(2-aminoethyl)-indoles including acid addition salts thereof, the steps of mixing an indole having the formula:

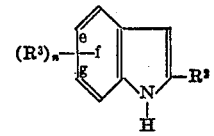

wherein $R^2$ is selected from the group consisting of hydrogen, aryl, aralkyl, and lower-alkyl, $n$ is an integer from zero to four, and $R^3$ is selected from the group consisting of carboxy, cyano, dialkylamino, lower-carbalkoxy, halogen, lower-alkyl, aryl, aralkyl, aryloxy, a lower-alkoxy, a benzyloxy, and an acyloxy radical wherein the acyl substituent is from an organic carboxylic acid, and a fused arylene radical, with an oxalyl halide to produce a 3-indoleglyoxylyl halide, reacting the 3-indoleglyoxylyl halide with a compound selected from the group consisting of a primary amine, secondary amine, and ammonia to produce a 3-indoleglyoxylamide, and reducing the 3-indoleglyoxylamide with lithium aluminum hydride to prepare a 3-(2-aminoethyl)-indole.

13. In a process for the preparation of 5-benzyloxy-3-(2-N,N-dibenzylaminoethyl)-indole including acid addition salts thereof, the steps of mixing 5-benzyloxyindole with oxalyl chloride to produce 5-benzyloxy-3-indoleglyoxylyl chloride, and reacting 5-benzyloxy-3-indoleglyoxylyl chloride with dibenzylamine to produce 5-benzyloxy-N,N-dibenzyl-3-indoleglyoxylamide, and reducing the 5-benzyloxy-N,N-dibenzyl-3-indoleglyoxylamide with lithium aluminum hydride to prepare 5-benzyloxy-3-(2-N,N-dibenzylaminoethyl)-indole.

14. In a process for the preparation of 5-benzyloxy-3-(2-N,N-dibenzylaminoethyl)-indole including acid addition salts thereof, the steps of mixing 5-benzyloxyindole with oxalyl chloride to produce 5-benzyloxy-3-indoleglyoxylyl chloride, and reacting 5-benzyloxy-3-indoleglyoxylyl chloride with benzylamine to produce 5-benzyloxy-N-benzyl-3-indoleglyoxylamide, and reducing 5-benzyloxy-N-benzyl-3-indoleglyoxylamide with lithium aluminum hydride to prepare 5-benzyloxy-3-(2-N-benzylaminoethyl)-indole.

15. In a process for the preparation of 3-(2-aminoethyl)-indole including acid addition salts thereof, the steps of mixing indole with oxalyl chloride to produce 3-indoleglyoxylyl chloride, and reacting 3-indoleglyoxylyl chloride with ammonia to produce 3-indoleglyoxylamide, and reducing the 3-indoleglyoxylamide with lithium aluminum hydride to prepare 3-(2-aminoethyl)-indole.

16. In a process for the preparation of 3-(2-N-benzyl-N-methyl-aminoethyl)-indole including acid addition salts thereof, the steps of mixing indole with oxalyl chloride to produce 3-indoleglyoxylyl chloride, and reacting 3-indoleglyoxylyl chloride with N-benzyl-N-methylamine to produce N-benzyl-N-methyl-3-indoleglyoxylamide, and reducing the N-benzyl-N-methyl-3-indoleglyoxylamide with lithium aluminum hydride to prepare 3-(2-N-benzyl-N-methylaminoethyl)-indole.

17. In a process for the preparation of 3-(2-N,N-diethylaminoethyl)-indole including acid addition salts thereof, the steps of mixing indole with oxalyl chloride to produce 3-indoleglyoxylyl chloride, and reacting 3-indoleglyoxylyl chloride with diethylamine to produce N,N-diethyl-3-indoleglyoxylamide, and reducing the N,N-diethyl-3-indoleglyoxylamide with lithium aluminum hydride to prepare 3-(2-N,N-diethylaminoethyl)-indole.

18. In a process for the preparation of 3-(2-aminoethyl)-indoles including acid addition salts thereof, the step of reducing a 3-indoleglycolamide with lithium aluminum hydride.

19. In a process for the preparation of 3-(2-aminoethyl)indoles including acid addition salts thereof, the step of reducing a 3-indoleglyoxylamide with lithium aluminum hydride.

20. 5,6-dimethoxy-3-(2-N,N-dibenzylamino-ethyl)-indole.

21. In a process for the preparation of 3-(2-aminoethyl)-indoles including acid addition salts thereof, the steps of mixing an indole with an oxalyl halide to produce a 3-indoleglyoxylyl halide, reacting the 3-indoleglyoxylyl halide with a primary amine to produce a 3-indoleglyoxylamide, and reducing the 3-indoleglyoxylamide with lithium aluminum hydride to prepare a 3-(2-aminoethyl)-indole.

22. In a process for the preparation of 3-(2-aminoethyl)-indoles including acid addition salts thereof, the steps of mixing an indole with an oxalyl halide to produce a 3-indoleglyoxylyl halide, reacting the 3-indoleglyoxylyl halide with a secondary amine to produce a 3-indoleglyoxylamide, and reducing the 3-indoleglyoxylamide with lithium aluminum hydride to prepare a 3-(2-aminoethyl)-indole.

23. In a process for the preparation of 3-(2-aminoethyl)-indoles including acid addition salts thereof, the steps of mixing an indole with an oxalyl halide to produce a 3-indoleglyoxylyl halide, reacting the 3-indoleglyoxylyl halide with ammonia to produce a 3-indoleglyoxylamide, and reducing the 3-indoleglyoxylamide with lithium aluminum hydride to prepare a 3-(2-aminoethyl)-indole.

24. In a process for the preparation of 3-(2-aminoethyl)-indoles including acid addition salts thereof, the steps of reducing the ring-attached carbonyl group of 3-indoleglyoxylamides to a carbinol group with a reducing agent selected from the group consisting of sodium borohydride, lithium borohydride, and aluminum amalgam, and then reducing the thus-produced compound with lithium aluminum hydride to produce the desired 3-(2-aminoethyl)-indole.

25. In a process for the preparation of 3-(2-aminoethyl)-indoles including acid addition salts thereof, the steps of catalytically hydrogenating the ring-attached carbonyl group of 3-indoleglyoxylamides to a carbinol group with hydrogen, and then reducing the thus-produced compound with lithium aluminum hydride to produce the desired 3-(2-aminoethyl)-indole.

26. A 3-indoleglyoxylamide having the formula:

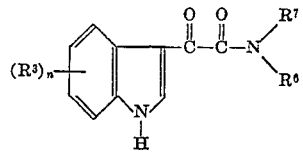

wherein $n$ is an integer from one to four, $R^3$ is a radical containing not more than 15 carbon atoms and is selected from the group consisting of a lower-alkoxy, a benzyloxy, and an acyloxy radical wherein the acyl substituent is from a hydrocarboncarboxylic acid containing from one to eight carbon atoms, inclusive, $R^6$ and $R^7$ are selected from the group consisting of hydrogen, benzyl, and a lower-alkyl radical containing from one to eight carbon atoms, inclusive, and additional members of this series wherein $R^6$ and $R^7$ together with $-N<$ form a heterocyclic radical selected from the group consisting of morpholino and piperidino.

References Cited in the file of this patent

UNITED STATES PATENTS

| 2,305,501 | Spielman | Dec. 15, 1942 |
| 2,315,661 | Salzer et al. | Apr. 6, 1943 |
| 2,414,715 | Britton et al. | Jan. 21, 1947 |
| 2,692,882 | Speeter | Oct. 26, 1954 |

OTHER REFERENCES

Jour. Am. Chem. Soc., vol. 52, 5030 (1930).
Jour. Am. Chem. Soc., vol. 72, pages 3586–8 (1950).
Jour. Org. Chem., vol. 16, page 807 (1951).
Jour. Org. Chem., vol. 18, pages 507–515 (1953).
Jour. Biol. Chem., vol. 180, page 967 (1949).
Hamlin et al.: J. Am. Chem. Soc., vol. 73, page 5007 (1951).
Graves et al.: J. Chem. Soc., vol. 1952, page 650.
Chem. of Heterocyclic Compounds, Sumpter et al., Interscience Publ. Inc., N. Y., page 69 (1954).